Figure 1:
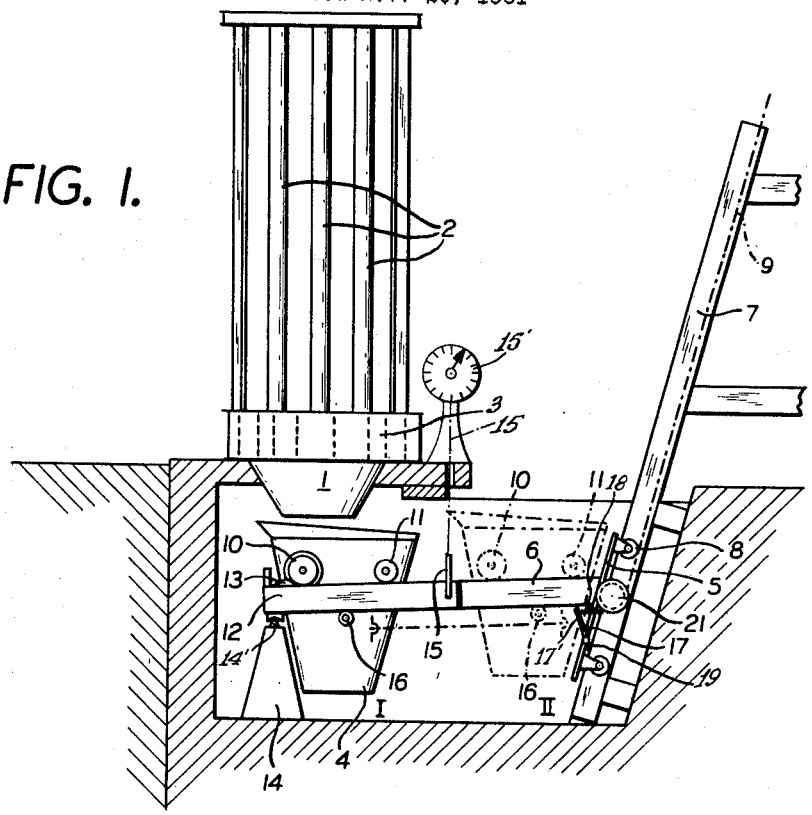

June 9, 1964  E. MAUDERER  3,136,434
APPARATUS FOR DISTRIBUTING AND WEIGHING OF GOODS IN BULK
Filed Nov. 20, 1961

INVENTOR
EWALD MAUDERER
BY
ATTORNEY.

3,136,434
APPARATUS FOR DISTRIBUTING AND WEIGHING OF GOODS IN BULK
Ewald Mauderer, Volkersbach, Baden, Germany, assignor to Elba-Werk Ettlinger Baumaschinen- und Hebezeugfabrik G.m.b.H., Ettlingen-Baden, Germany, a corporation of Germany
Filed Nov. 20, 1961, Ser. No. 153,535
Claims priority, application Germany Nov. 24, 1960
6 Claims. (Cl. 214—100)

The present invention relates to an apparatus for distributing and weighing of granular material capable of being heaped, particularly of mixture components for the preparation of concrete.

For the manufacture of concrete of constant quality and in sufficient quantities, particularly in larger projects, plants are used which comprise the storage of the admixing material, a cement silo, a distributing apparatus and a mixer. In this case sand, gravel, as well as splints of different granulation are stored either in high bunkers or are heaped in sector-shaped, divided storage places disposed around the distribution apparatus.

The proportional quantities of the ingredients to be added are distributed through bunker closures or outlets provided in the distributing apparatus to a measuring container for the volumetric measuring or to a weighing container for the weight measuring.

Then, the weighed ingredients are fed from the weighing container into the elevator tub of the mixer, which provides the feeding to the mixing container by means of an inclined elevator. First of all, in case of storing of the ingredients at ground level in sector-shaped storing places disposed around the distributing apparatus, it is required to provide an excavation for the receipt of the weighing container and for the elevator tub disposed below the weighing container, which excavation has a depth of several feet in larger projects. This excavation must then be particularly stayed and its arrangement can lead to difficulties in case of a high level of ground water or in case of already existing feeding means.

For this reason, it has been already proposed to arrange the receiving container and the weighing apparatus as a tilting container on ground level and merely to arrange the elevator tub below ground level, into which the content of the weighing container is emptied. This brings about, however, the requirement, that the discharge openings of the sector-shaped stores must be provided at a raised level and the ingredients must be heaped higher, in order to make possible an automatic flow thereof into the weighing container. A depth storage results for an appreciable part of the additional ingredients, which is undesirable.

Furthermore, it has been also proposed to form the receiving container for the additional ingredients as charging carriage, which is independent from the mixer, movable and equipped with a weighing device, the content of the charging carriage being likewise emptied into the elevator tub, while the latter is below ground level.

Here, likewise, the drawback of raised discharge openings in the closing walls of the storage places for the additional ingredients must be taken in stride. Furthermore, the provision and use of a self-weighing charging carriage amounts to an additional load on the economy of the total concrete-forming plant.

It is, therefore, one object of the present invention to provide an apparatus for distributing and weighing of goods in bulk, particularly of mixing ingredients for the preparation of concrete, which is characterized by its simplicity and economy.

It is another object of the present invention to provide an apparatus for distributing and weighing of goods in bulk, wherein an elevator tub disposed on an elevator slide of the mixer serves simultaneously as weighing container, and which is separated from the elevator slide which has been moved downwardly for the dosage operation, as well as for the weighing process, moved onto the beam of a scale, moved back again upon termination of the weighing process, and to be connected again with the elevator slide and raised then to the mixer.

In this case the locking of the lowered elevator slide is brought about by a spring-biased pawl, which engages a recess in the elevator rail, as soon as the elevator tub is moved away from the elevator slide.

It is still another object of the present invention to provide an apparatus for the distributing and weighing of goods in bulk, wherein the automatic run-off of the elevator slide is brought about by means of rollers disposed laterally on the tub, due to the inclined position of the slide arms, as well as of the weighing beam, and due to the corresponding release of the elevator rope by the own weight of the tub. Upon termination of the weight dosing of the additional ingredients in the elevator tub, the latter is returned by means of the elevator rope to the slide, releasing the latter and running then on the U-shaped elevator rails upwardly to the mixing container.

Figure 2:
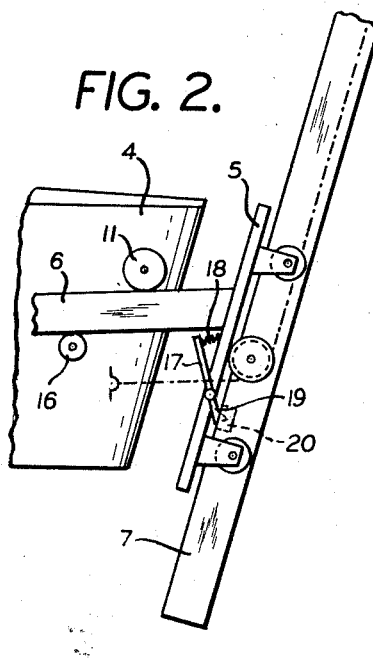

With these and other objects in view, which will become apparent in the following detailed description, the present invention will be clearly understood in connection with the accompanying drawings, in which:

FIGURE 1 is a schematic longitudinal section of the apparatus for distributing and weighing of goods in bulk, designed in accordance with the present invention; and FIG. 2 is a fragmentary elevation of the means for locking the elevator slide in its lower end position.

Referring now to the drawings, it will be apparent that the apparatus, designed in accordance with the present invention, comprises a distributing device 2, the bottom portion 3 of which is equipped with discharge openings and the ingredients are fed from the distributing device 2 through the discharge member 1 into the weighing container 4. The ingredients may be stored by example, in sector-shaped storage places disposed around the distributing device 2 or in a high bunker (not shown).

An elevator tub 4 serves here as the weighing container, which elevator tub 4 rests in the position II (shown in dotted lines) on the slide arms 6 and is connected with the elevator slide 5. In this position, the elevator slide 5 runs down with the empty elevator tub 4 from the mixer (not shown), thus, from above by means of the rollers 8 secured to the elevator slide 5, which movement is guided by elevator rails 7 and controlled by an elevator rope 9 to assume the position II.

Upon further release of the elevator rope 9 and due to the inclined position of the slide arms 6, as well as by its own weight, the elevator tub 4 runs then on its own rollers 10 and 11 mounted thereon from the slide arms 6 onto a scale beam 12, until this movement is stopped by means of the abutment 13 or due to the limit of the release of the rope 9, until the elevator tub 4 reaches the weighing position I. In this position of the elevator tub 4 the filling of the tub or bunker 4 and simultaneously the weighing process takes place. The scale beam 12 is tiltingly mounted for this purpose, on the one hand, at its rear end on the support 14, by means of an edge 14' disposed on top of the support 14, while its free forward end is connected with scale rods 15 (shown schematically) of a scale 15', which scale rods 15 lift and lower, respectively, the free forward end of the scale beam 12 during the weighing and lowering movement of the scale beam 12 is made possible by the complete separation of the scale beam 12 from the slide arms 6 by forming a narrow gap between the latter and the scale beam 12.

Upon termination of the filling and weighing procedure, the elevator tub is withdrawn by the elevator rope 9 from the position I into the position II, by moving the elevator tub 4 on its rollers 10 and 11 from the scale beam 12 onto the slide arms 6, which elevator tub 4 unlocks, thereby, the elevator slide 5 upon reaching a position of engagement with the elevator slide 5 (as shown in position II) and the elevator slide 5 runs upwardly together with the elevator tub 4 on the elevator rails 7 towards the mixer (not shown).

In order to secure the tub 4 to the scale beam 12 during the weighing operation and to the slide arms 6 during the rising movement of the elevator tub 4, guide rollers 16 are provided, which are disposed below the running rollers 10 and 11 on opposite sides of the tub 4 for engagement with the bottom face of the scale beam 12 and with the bottom face of the slide arms 6, respectively, and prevent a lifting of the elevator tub 4 from the scale beam 12 and from the slide arms 6.

The locking of the elevator slide 5 in its lowermost position is brought about by means of a double-armed lever 17 (FIG. 2), by locking one arm 19 of the lever 17 in a recess 20 upon reaching the lowermost position of the elevator tub 4, which recess 20 is provided in the elevator rail 7. The locking position of the lever 17 is brought about by means of a spring 18 disposed between the other arm 17' of the lever 17 and the outer face of the elevator slide 5.

In the position II of the elevator tub 4, the latter urges the arms 17' of the lever 17 against the elevator slide 5 against the force of the spring 18, at the same time releasing the other arm 19 of the lever 17 from the recess 20, so that upon movement of the elevator tub 4 onto the slide arms 6 the unlocking procedure takes place automatically, while upon movement of the tub 4 onto the scale beam 12, the tension of the spring 18 urges the arm 17' into its inclined position and simultaneously the arm 19 into its locking position. It is thus possible to lift the elevator tub 4 upon reaching the elevator slide engaging position.

A guide roller 21 is provided for the guidance of the elevator rope 9, which guide roller 21 is disposed on the backside of the elevator slide 5.

It has been found of particular advantage that the apparatus, designed in accordance with the present invention, can be disposed in a low excavation due to the elimination of the weight container. Furthermore, the time for the entire working cycle is shortened by the period, which was required until now, for the emptying of the weight container into the elevator tub.

While I have disclosed one embodiment of the present invention, it is to be understood that this embodiment is given by example only and not in a limiting sense, the scope of the present invention being determined by the objects and the claims.

I claim:
1. An apparatus for distributing and weighing of goods in bulk, particularly for the preparation of concrete, comprising
    a pair of elevator rails disposed in upward direction,
    an elevator tub adapted to receive said goods in bulk and to be moved from a weighing position to a lifting position,
    an elevator slide riding on said elevator rails,
    slide arms projecting from said elevator slide and releasably carrying said elevator tub in its lifting position,
    a scale beam tiltingly mounted adjacent to but disconnected from said slide arms for independent movement and connected with weighing means and supporting said elevator tub in its weighing position,
    the top face of said slide arms in their lowermost lifting position being disposed in a plane substantially identical with that of the top face of said scale beam in its inoperative non-weighing position,
    means for moving said elevator tub from said scale beam in its weighing position onto said slide arms in their lowermost lifting position, and
    means for lifting said elevator tub jointly with said slide arms and said elevator slide, along said elevator rails to an upper position.
2. The apparatus, as set forth in claim 1, wherein
    said slide arms of said elevator slide and said scale beam are disposed substantially in a plane inclined downwardly from said slide arms towards said scale beam, in order to cause movement of said elevator tub by gravity onto said scale beam,
    said means for moving said elevator tub from said slide arms onto said scale beam comprises an elevator rope, secured at its lower end to said elevator tub,
    said rope being released to permit said elevator tub to be moved automatically by its own weight from its lifting position to its weighing position, and
    an abutment disposed at the rear end of said scale beam to provide limiting means for the movement of said elevator tub onto said scale beam.
3. The apparatus, as set forth in claim 1, which includes
    running rollers disposed on opposite sides of said elevator tub and adapted to run on the top face of said slide arms and the top face of said scale beam, respectively, and
    guide rollers secured at opposite sides of said elevator tub below said running rollers and adapted to run on the bottom face of said slide arms and of said scale beam, respectively,
    in order to prevent an undesirable lifting of said elevator tub from said slide arms and of said scale beam, respectively.
4. The apparatus, as set forth in claim 1, comprising
    a support carrying said scale beam, and scale rods extending from said scale beam for connection with said weighing means.
5. The apparatus, as set forth in claim 1, which includes
    means for automatically locking said elevator slide in its lowermost position, and
    means for automatically unlocking said elevator slide upon return of said elevator tub from said scale beam to said slide arms.
6. The apparatus, as set forth in claim 5, wherein
    said means for locking and unlocking, respectively, said elevator slide comprises a double-armed lever,
    said double-armed lever being pivotally mounted intermediate its end on said elevator slide,
    resilient means tending to move away one arm of said double-armed lever from said elevator rails and simultaneously to engage the end of the other arm of said double-armed lever with said elevator rails,
    the rear wall of said elevator tub moving said one arm of the double-armed lever towards said elevator rails against the force of said resilient means simultaneously releasing said other arm from its locking position, and
    a rope disposed along said elevator rail and connected at its lower end with said elevator tub, and lifting said elevator slide jointly with said elevator tub along said rails from its lifting position to an upper position.

References Cited in the file of this patent
UNITED STATES PATENTS

| | | |
|---|---|---|
| 938,879 | Larsen | Nov. 2, 1909 |
| 2,647,651 | Vincent | Apr. 4, 1953 |
| 2,982,425 | Moore | May 2, 1961 |

FOREIGN PATENTS

| | | |
|---|---|---|
| 94,098 | Norway | Apr. 11, 1959 |